United States Patent
Sarkar et al.

(10) Patent No.: US 8,300,620 B1
(45) Date of Patent: Oct. 30, 2012

(54) DYNAMICALLY TUNING A TIMER MECHANISM ACCORDING TO RADIO FREQUENCY CONDITIONS

(75) Inventors: Debasish Sarkar, Irvine, CA (US); Siddharth S. Oroskar, Overland Park, KS (US); Sachin R. Vargantwar, Overland Park, KS (US); Manoj Shetty, Overland Park, KS (US); Deveshkumar N. Rai, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 843 days.

(21) Appl. No.: 12/345,195

(22) Filed: Dec. 29, 2008

(51) Int. Cl.
 *H04J 3/24* (2006.01)
(52) U.S. Cl. ........ 370/349; 370/355; 370/401; 370/230; 370/236; 370/389
(58) Field of Classification Search .................. 370/349, 370/355, 401, 230, 236, 389
See application file for complete search history.

(56) References Cited

U.S. PATENT DOCUMENTS

| | | | | |
|---|---|---|---|---|
| 6,381,215 | B1 * | 4/2002 | Hamilton et al. | 370/236 |
| 7,756,132 | B2 * | 7/2010 | Copps | 370/392 |
| 7,765,307 | B1 * | 7/2010 | Kritov et al. | 709/228 |
| 2002/0150048 | A1 * | 10/2002 | Ha et al. | 370/231 |
| 2003/0012212 | A1 * | 1/2003 | Earnshaw et al. | 370/428 |
| 2003/0012222 | A1 * | 1/2003 | Rinchiuso | 370/468 |
| 2003/0081553 | A1 * | 5/2003 | Bitar | 370/236 |
| 2003/0156599 | A1 * | 8/2003 | Casaccia et al. | 370/474 |
| 2008/0137614 | A1 | 6/2008 | Kwon | |
| 2008/0317017 | A1 * | 12/2008 | Wiemann et al. | 370/389 |

OTHER PUBLICATIONS

Evolution-Data Optimized, Dec. 11, 2008, pp. 1-6, http://en.wikipedia.org/wiki/evdo.
Telecommunications Link, Dec. 11, 2008, pp. 1-2, http://en.wikipedia.org/wiki/reverse_link.

* cited by examiner

*Primary Examiner* — Ricky Ngo
*Assistant Examiner* — Rasheed Gidado (57) ABSTRACT

Systems, methods, and computer-readable media for adjusting a timer mechanism based on radio frequency (RF) conditions of a network connecting source and destination devices are provided. Initially, data packets transmitted by the source device are assigned an ordering. This ordering is compared to an actual order in which the data packets are received at the destination device to ascertain whether any data packets were missing due to RF conditions. A negative response indicating missing, or lost, data packets may be returned, thereby invoking the source device to retransmit the data packets identified as missing. The device(s) may compute a probability of packet-loss (utilizing a recorded history of the transmitted packets in conjunction with the data packets actually received) and utilize the packet-loss probability to dynamically tune a time-interval of the timer mechanism. Upon expiration of the time-interval, the timer mechanism instructs the source device to retransmit the initial data packets.

19 Claims, 7 Drawing Sheets

DYNAMICALLY TUNING A TIMER MECHANISM ACCORDING TO RADIO FREQUENCY CONDITIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Within the wireless industry, service providers have employed a variety of tools to aid in transferring a data item between devices separated by wireless air interface. Service providers often employ some of these tools to deconstruct the data item prior to sending from a source device and to reconstruct the data item upon receipt at a destination device. In one instance, the tool may comprise a protocol that transmits the data item as segments in the form of data packets.

Often, when transmitting a data item as data packets, packet loss occurs. Generally, packet loss refers to a situation where packets of data traveling across a computer network fail to reach their destination. Packet loss is typically distinguished as one of the three main error types encountered in digital communications; the other two being bit error and spurious packets caused due to noise.

Packet loss can be caused by a number of factors, including signal degradation over the network medium, oversaturated network links, corrupted packets rejected in-transit, faulty networking hardware, maligned system drivers or network applications, or normal routing routines. When caused by network problems, lost or dropped data packets can result in highly noticeable performance issues or jitter with streaming technologies, voice over IP, online gaming and videoconferencing, and will affect all other network applications to a degree.

Some tools (e.g., network transport protocols) provide for reliable delivery of the data packets. For instance, in the event of data packet loss, the tools may invoke the destination device to ask for retransmission or may invoke the source device to automatically resend any segments that have not been acknowledged. Although the tools can help recover from data packet loss, retransmitting missing data packets causes the throughput of the wireless air interface to decrease. This drop in throughput is due to the inherent delay in acknowledgment of received data packets or recognition that data packets are indeed lost. To exaggerate this drop in throughput, most tools require that, upon recognizing that one or more data packets are lost, every packet that had been sent subsequent to the one or more lost data packets be resent along therewith.

In order to detect data packet loss, the tools are equipped to positively respond (e.g., acknowledgment character (ACK)) to the source device upon properly receiving each data packet. Alternatively, the tools may provide a negative response (e.g., negative acknowledgement character (NAK)) upon detecting a gap between incrementally labeled data packets. By way of example, consider a data item that is divisible into 20 packets upon deconstruction. If the tool detects packet 1, 2, 3, 4, and then packet 7, it will recognize a hole and transmit a NAK for packets 5 and 6. The NAK's are eventually captured by the source device, which attempt to retransmit the packets 5 and 6 in reply.

In some instances, the tool will start a timer in conjunction with transmitting NAK's. If the retransmitted packets 5 and 6 arrive before the timer expires, the destination device consumes the data packets 1-20. In this case, the destination device will provide an ACK to inform the source device to proceed with transmitting the subsequent data packets 20-N. If no ACK is received by the source device before the time expires, it will assume that the data packets are lost and will attempt to retransmit each of the data packets 1-20 again. Because the current tool is optimized for accurate delivery rather than timely delivery, the tool sometimes incurs relatively long delays while waiting for positive/negative responses or retransmissions of lost data packets, and it is not particularly suitable for transmitting data items generated from real-time applications (e.g., voice communications).

As such, employing a flexible technique for triggering a source device to resend data packets not received by a destination device that takes into account RF conditions of a wireless communication channel therebetween, would enhance an end user's experience when transferring information within a wireless network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

Some embodiments provide computer-readable media for, among other things, dynamically tuning a timer mechanism (e.g., abort timer) based on radio frequency (RF) conditions of a wireless communication path between a source device and a destination device. In particular embodiments, data packets provided by the source device are assigned a predefined ordering. This predefined ordering is compared to the actual order in which the data packets were received at the destination device to ascertain whether any data packets were lost due to RF conditions. A negative response indicating any missing, or lost, data packets may be returned to the source device; accordingly, invoking the source device to retransmit the data packets identified as missing. In addition, the source device, or the destination device, may compute a probability of packet-loss (e.g., utilizing at least a recorded history of the transmitted packets in conjunction with the data packets actually received) and utilize the packet-loss probability to dynamically tune the timer mechanism. Dynamically tuning the timer mechanism has several practical applications in the technical arts, including adjusting a time-interval that, upon expiration, instructs the source device to resend the data packets. Accordingly, by linking the time-interval to the packet-loss probability, the timer mechanism is adaptable to RF conditions in real-time. Advantageously, tuning the timer mechanism facilitates efficient utilization of RF conditions and promotes a reduction of the transmission delay between the data packets, when appropriate, thereby improving reliability without sacrificing quality.

Embodiments generally relate to methods and devices for dynamically tuning a timer mechanism to optimize transmission of one or more data packets within a wireless network. More particularly, a first aspect of an embodiment includes one or more computer-readable media that have computer-useable instructions embodied on a destination device for implementing the method dynamically tuning the timer mechanism. Initially, the method may include detecting the data packets transmitted from a source device and assembling the detected data packets according to an ordering predefined by the source device. Based on the ordering, at least one data packet may be ascertained to be missing. In this instance, one or more requests may be communicated to the source device to retransmit the missing data packet(s). Typically, the source device is configured to calculate a probability of packet-loss utilizing a recorded history of the requests for retransmission. The method may further include dynamically tuning a time-interval of the timer mechanism in accordance with the calculated probability of packet-loss. In operation, the timer mechanism, upon elapse of the time-interval, invokes the source device to retransmit the data packets according to the predefined ordering. The tuned time-interval may be stored, at least temporarily, for future reference by the source device, destination device, and/or the timer mechanism.

In a second aspect, embodiments are directed toward a computerized method for dynamically tuning a timer mechanism based on a calculated probability of packet-loss. Initially, one or more data packets are transmitting from a source device to a destination device. These transmitted data packets may be enumerated in a recorded history. In response, if one or more of the data packets are lost in transmission, request(s) may be received from the destination device to retransmit the missing data packet(s) ascertained to be missing. The source device may enumerate the received request(s) in the recorded history. A probability of packet-loss may be calculated utilizing information within a rolling timeframe of the recorded history. A time-interval of the timer mechanism may be dynamically tuned in accordance with the calculated probability of packet-loss. In operation, the timer mechanism, upon elapse of the time-interval, invokes retransmittal of each of the data packets. The computerized method may further include relaying instructions to the timer mechanism to start the tuned time-interval upon receiving the request(s) from the destination device.

A further aspect of an embodiment takes the form of a computer system capable of performing a process that dynamically tunes a timer mechanism based on transmitted data packets and requests for retransmission of those data packets that are received out of order. Generally, the computer system includes a processing unit coupled to a computer storage medium, where the computer storage medium has a plurality of computer software components stored thereon that are executable by the processing unit. Initially, the computer software components include a sending component, a receiving component, and the timer mechanism. The sending component is configured to transmit the data packets to a receiving component, based on a predefined ordering, and to enumerate the transmitted data packets in a recorded history. The receiving component is configured to detect and assemble the transmitted data packets, and to communicate the requests for retransmission of a portion of the data packets that are received out of order in comparison against the predefined ordering. In embodiments, the sending component may be further configured to calculate a probability of packet-loss utilizing the recorded history in concert with the requests for retransmission. The timer mechanism is configured with a time-interval that is capable of being dynamically tuned in accordance with the calculated probability of packet-loss. Upon elapse of the time-interval, the timer mechanism may be further configured to invoke the source device to retransmit the data packets.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments provide systems and methods for employing a flexible technique for tuning a time-interval of a timer mechanism (e.g., abort timer) based on radio frequency (RF) conditions of a wireless communication environment. The RF conditions may be expressed by positive responses, such as acknowledgement code (AKC), or negative responses, such as negative acknowledgement code (NAK), that are communicated in response to the transmission of data packets. Tuning the time-interval of the timer mechanism in accordance with positive and negative responses is useful to enhance an end user's experience when exchanging information (e.g. voice communications, media files, and other data items) within a wireless network. That is, by monitoring the NAK's and the ACK's in a recorded history, deriving a probability of packet-loss from a snapshot of the recorded history (e.g., taking into account the transmitted data packets and other criteria within a rolling timeframe), and dynamically tuning the time-interval based on the packet-loss probability, the time-interval used to invoke retransmission of data packets, upon elapse, can be adjusted in real-time. Real-time adjustment based on the packet-loss probability ensures a quality, reliable transfer of the data item in poor RF conditions, while facilitating a reduction of delay in packet distribution during good RF conditions.

Acronyms and Shorthand Notations

Throughout the description, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ACK | Acknowledgement Code |
| ISN | Initial Sequence Number |
| LANs | Local Area Networks |
| NAK | Negative Acknowledgement Code |
| PDA | Personal Digital Assistant |
| RF | Radio Frequency |
| RLP | Radio Link Protocol |
| TCP | Transmission Control Protocol |
| WANs | Wide Area Networks |

Further, various technical terms are used throughout this description. A definition of such terms can be found in *Newtons Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate embodiments may be embodied as, among other things, a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
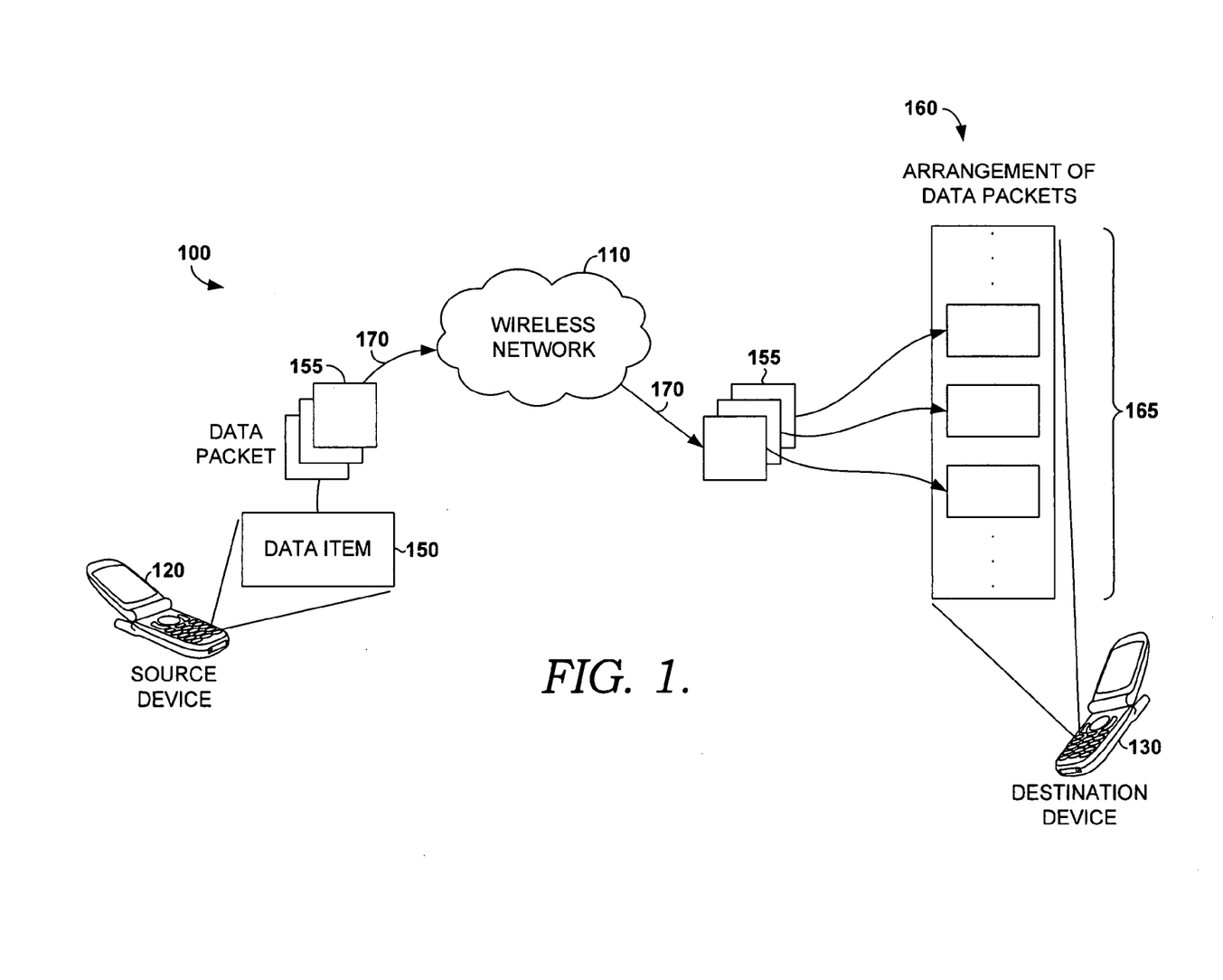
FIG. 1 is a block diagram of an exemplary system architecture suitable for use in implementing embodiments of the present invention.

Methods and systems are provided for dynamically tuning a timer mechanism to optimize transmission of data packets within a wireless network (see wireless network 110 of FIG. 1). In an exemplary embodiment, the wireless network may support transmission control protocol (TCP). Generally, the TCP, or often referred to as "TCP/IP," is a protocol supports the flow of transmissions from computer to computer and operates at a higher level, typically concerned with the two end systems (e.g., Web browser and Web server). By way of example, the transmission(s) may take the form of a message that is carried on the Internet. Besides the Internet, other common applications of the TCP include e-mail and file transfer. Accordingly, embodiments of the present invention contemplate utilizing the TCP to implement management tasks such that the TCP facilitates providing reliable, ordered delivery of a stream of bytes from one program on one computer to another program on another computer.

Among these contemplated management tasks, the TCP may be employed to control message size, the rate at which messages are exchanged, network traffic congestion, etc. In particular, in order to manage the exchange of messages, the TCP may be employed to assist in providing reliable stream delivery that attempts to guarantee delivery of a data stream sent from one computer, or host, to another without duplication or loss of data. Managing messages is valuable as unmonitored packet transfer is unreliable due to extraneous factors that disrupt communication channels (e.g., poor RF conditions).

In one instance, the TCP is employed to manage communications via utilizing a set of rules. This set of rules instructs a source device (e.g., Web server) to send data in a form of message units, data packets, or segments, to a destination device (e.g., Web browser) over one or more communication channels (e.g., Internet). At the same time that the TCP is employed to facilitate handling the actual delivery of the data packets, and keeping track of the individual data packets that a message or data item is divided into, thereby achieving reliable routing across the wireless network. For example, when a hyper-text markup language (HTML) file is sent from the Web server to the Web browser, the TCP installed on the Web server receives the file as a stream of bytes, divides the stream into segments, numbers the segments, and then forwards the numbered segments individually to the Web browser. Forwarding may further include transforming each TCP segment into an Internet protocol (IP) packet-style of data packet by adding a header which includes, among other things, a destination IP address of the Web browser. In embodiments, packets with the same destination IP address may be routed differently through the wireless network.

Referring to the drawings in general, and initially to FIG. 1 in particular, a block diagram of an exemplary operating environment is shown and designated generally as system 100 configured to disassemble a data item 150 into data packets 155, transmit the data packets 155 across a wireless network 110, and reassemble the data packets into an arrangement of data packets 160. It should be understood that this and other arrangements described herein are set forth only as examples. Other arrangements and elements (e.g., machines, interfaces, functions, orders, and groupings of functions, etc.) can be used in addition to, or instead of, those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory, as discussed supra.

With continued reference to FIG. 1, an exemplary system architecture is illustrated that shows the exemplary system 100 configured to initiate transmission, and possibly retransmission, of the data item 150 from a first device (e.g., source device 120) to at least a second device (e.g., destination device 130) of a plurality of candidate devices that are interconnected via the wireless network 110. Initially, the system 100 includes the devices 120 and 130 operably coupled over the wireless network 110. In embodiments, one or more of the devices 120 and 130 may take the form of a mobile device that is configured to transmit/receive communications via a wireless connection 170. Further, the mobile device may be configured to move within the system 100, thereby causing rerouting of the wireless connection 170 through the wireless network 110 as appropriate. Generally, the mobile device may be any type of device having communications capability. For instance, the mobile device may be, or variously referred to as, a handheld device, mobile handset, consumer electronics device, cell phone, personal digital assistant (PDA) unit, and the like.

In addition, each mobile device is provisioned with hardware that facilitates transmission and receptions of signals over the wireless connection 170. These signals may include data packets 155 and other communications that are consistent with a call, data session, etc. These communications may be transmitted/received at the commencement or ending of establishing the wireless connection 170, or at any time(s) therebetween.

In other embodiments, the devices 120 and 130 may comprise a computing device. By way of example only and not limitation, the computing device may be a personal computer, desktop computer, laptop computer, consumer electronic device, handheld device, various servers, and the like. It should be noted, however, that embodiments of the present invention are not limited to implementation on such computing devices, but may be implemented on any of a variety of different types of computing devices within the scope of embodiments of the present invention.

Figure 2:
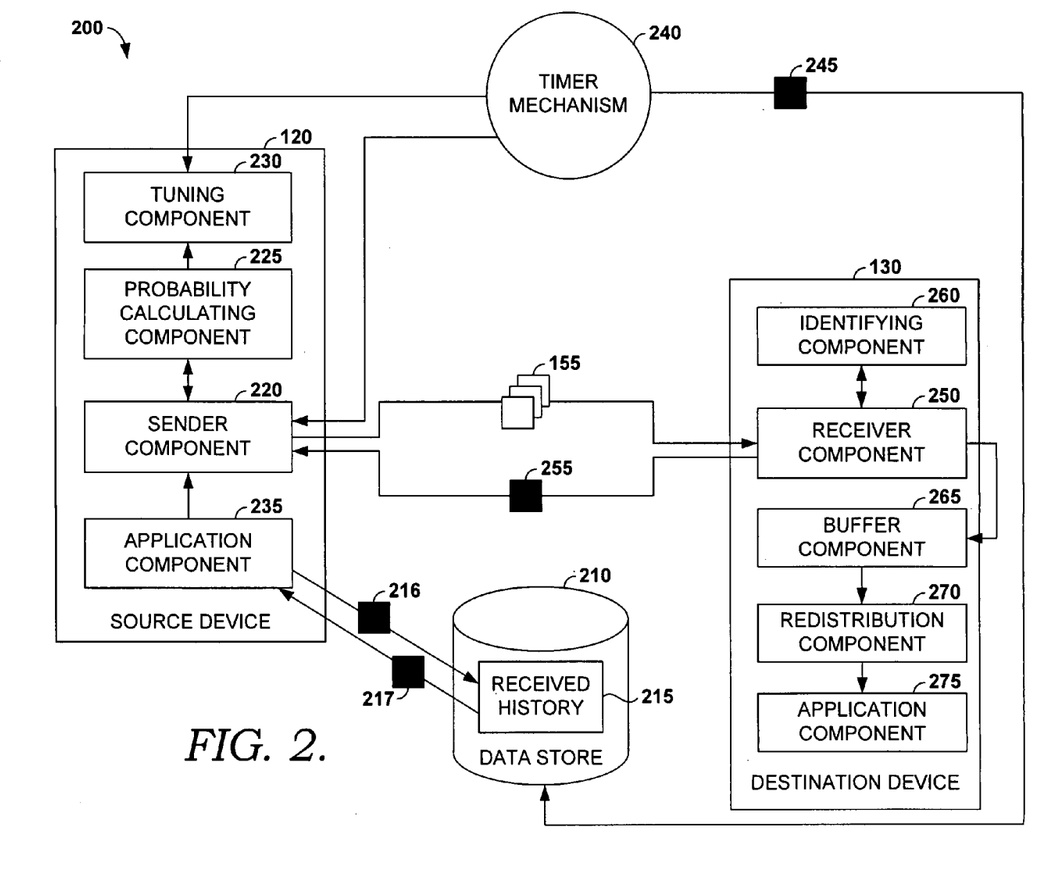
FIG. 2 is a block diagram of an exemplary wireless network environment that depicts dispersed devices and a timer mechanism for promoting communication of data packets through a wireless network, in accordance with an embodiment of the present invention.

Typically, each of the devices 120 and 130 include, or is linked to, some form of a computing unit (e.g., central processing unit, microprocessor, etc.) to support operations of the component(s) running thereon (see sending component 220 and receiving component 250 of FIG. 2). As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the devices 120 and 130 to enable each device to perform communication-related processes and other operations (e.g., disassembly, reassembly, comparison functionality, and the like). In another instance, the computing unit may encompass a processor coupled to the computer-readable medium accommodated by each of the devices 120 and 130. Generally, the computer-readable medium stores, at least temporarily, a plurality of computer software components (e.g., components 220, 225, 230, 235, 250, 260, 265, 270, 275 of FIG. 2) that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions (e.g., saving a tuned time-interval to the computer-readable memory).

Also, beyond processing instructions, the processor may transfer information to and from other resources (not shown) that are integral to, or disposed on, the devices 120 and 130. Generally, resources refer to software and hardware mechanisms that enable the devices 120 and 130 to perform a particular function. By way of example only, the resources may include one or more of the following mechanisms: imaging apparatuses (e.g., user-interface display); data stores (e.g., data store 215); printing devices; paging systems; audio alert devices; media-display units, and the timer mechanism 240. In other embodiments, the timer mechanism 240 may by incorporated within the source device 120, the destination device 130, or both.

In operation, the source device 120 may establish a wireless connection 170, path, or channel over a wireless air interface, such as the wireless network 110, that supports transporting data packets 155. In one instance, radio link protocol (RLP) is employed to assist with the transportation of the data packets 155. The RLP is generally an automatic repeat request fragmentation protocol used over wireless air interfaces, such as a cellular interface, that assists in avoiding losing the data packets 155, or "packet-loss," when being routed to the destination device 130.

Initially, routing may involve the source device 120 up-calling information (e.g., stream of bytes, data stream, message, or any other data item 150) and disassembling the information to transmit as the data packets 155. In one instance, the disassembly is carried out according to a fragmentation scheme. The fragmentation scheme may define an ordering of the data packets 155, and assign the data packets 155 sequence numbers that correspond to the defined ordering. The ordering may be derived from the data item itself 150 or another criteria for ordering data that is known to one of ordinary skill in the relevant field. In addition, the fragmentation scheme may further govern the format (e.g., framing and compression) of the data packets 155 during transmission.

As discussed above, the fragmentation scheme may employ the TCP for formatting the data packets 155 during exchange. As discussed herein, the phrase "data packet" is not meant to be limiting but may encompass any formatted unit or piece of information. By way of example, a TCP-formatted data packet may include a sequence of bytes and consist of contents including a header followed by a body. The header describes the data packet's destination and, optionally, the routers to use for forwarding until it arrives at the destination device 130. The body typically contains the information which the data packet is transmitting.

The destination device 130, upon receipt of the data packets 155, may reassemble the data packets 155 into a block that includes an arrangement of the data packets 160. This arrangement of the data packets 160 substantially corresponds with the ordering defined by the source device 120. In this way, reassembling the individual data packets 155, or segments of the data item 150, ensures the transmitted information is correctly ordered as the destination device 130 streams it to an application (see application component 275 of FIG. 2). Further, the block is generally held for a predetermined time in a buffer. Holding the block for a predetermined time in the buffer may include aggregating the received data packets 155 until a limit of a receive window is satisfied.

Generally, the "receive window" refers to a pre-established memory characteristic that governs the amount of bytes, distributed via the data packets 155, that are buffered prior to redistribution to the application. In other words, the receive window (e.g., RWIN) describes the amount of data that a buffer in the destination device 130 can accept without acknowledging the sender (e.g., source device 120). If the sender does not received positive acknowledgement (e.g., ACK) for a first data packet it sent, it will stop and wait for any form of acknowledgement. In addition, the timer mechanism may start the elapsing the time-interval. If the time-interval of the timer mechanism expires (i.e., the wait time exceeds a certain limit) the sender may retransmit the data packets sent after the first data packet, thereby enhancing the quality of the data transfer.

Referring now to FIG. 2, a block diagram of an exemplary wireless network environment 200 is illustrated that shows dispersed devices and a timer mechanism 240 for promoting communication of the data packets 155 through a wireless network (e.g., wireless network 110 of FIG. 1), in accordance with an embodiment of the present invention. Initially, the dispersed devices include the source device 120 and the destination device 130. Although one of each type of device is shown, a plurality of each device interconnected within the exemplary wireless network environment 200 is contemplated by embodiments of the present invention.

In an exemplary embodiment, the source device 120 includes a sender component 220, an application component 225, a probability-computing component 230, and a tuning component 235. The application component 225, may be any program or computer software that can execute an application. Further, the application component 225 may reside, in full or in part, within the source device 120 or may be accommodated on another computing device linked to the source device 120. In operation, the application component 225 is configured to generate and relay a data stream or data item to the sender component 220.

As discussed above, the sender component 220 is configured to transmit one or more of the data packets 155 to the destination device 130. In embodiments, transmitting the data packets 155 may include the following steps, in no particular order: disassembling the data item (e.g., the data item 150 of FIG. 1) received from the application component 225, where disassembly is carried out according to the fragmentation scheme; defining an ordering based on the fragmentation scheme; and assigning the data packets 155 sequence numbers the correspond to the defined ordering. In other embodiments, transmitting the data packets 155 to the destination device 130 includes communicating the data packets 155, consistent with the defined ordering, as a stream of bytes over a wireless connection between the destination device 130 and the source device 120, where the wireless connection accommodates RLP.

In embodiments, the probability-computing component 230 is configured to enumerate the transmitted data packets 155 in a recorded history 215. Additionally, the probability-computing component 230, upon receiving one or more requests 255 from the destination device 130 to retransmit data packet(s) that are ascertained to be missing, is configured to enumerate the received requests 255 in the recorded history 215. The transfer of the enumerated data packets 155 and the enumerated requests 255 is depicted by reference numeral 216 of FIG. 2.

The recorded history 215 is generally a storage location that retains information accessible to the source device 120 and the destination device 130 and may be accommodated by either or both. As shown, the recorded history 215 is accommodated by a data store 210. The data store 120 is generally configured to store information associated with sending the data packets 155, such as how many are sent and how many are acknowledged as received by the destination device 130, or acknowledged as missing. In various embodiments, such information may include, without limitation, a number of the data packets 155 transmitted, timestamps associated with the transmitted data packets 155, sequence numbers associated with the transmitted data packets 155, acknowledgements (NAK's and ACK's) of whether the data packets 155 are detected by the destination device 130, and other features related to the transmission of the data packets 155 that are indicative of whether the data packets 155 have been successfully received.

In addition, the data store 210 may be configured to be searchable for suitable access of stored information. For instance, the data store 210 may be searchable for a number of data packets transmitted within a rolling timeframe and how many of those data packets failed to reach an intended target of the transmission (e.g., the destination device 130). It will be understood and appreciated by those of ordinary skill in the art that the information stored in the data store 210 may be configurable and may include any information relevant to the calculating a probability of packet-loss. The content and volume of such information are not intended to limit the scope of embodiments of the present invention in any way. Further, though illustrated as a single, independent component, the data store 210 may, in fact, be a plurality of databases, for instance, a database cluster, portions of which may reside on the source device 120, the destination device 130, another external computing device (not shown), and/or any combination thereof.

Accordingly, the probability-computing component 230 may be further configured to extract information 217 from the recorded history 215 and to calculate a probability of packet-loss utilizing the information 217 within the rolling timeframe. By way of example, calculating a probability of packet-loss utilizing information within a rolling timeframe of the recorded history 215 may include deriving a packet-loss percentage based on a ratio of the requests 255 for retransmission received within the rolling timeframe to the data packets 155 transmitted within the rolling timeframe. This packet-loss percentage may be periodically, continuously, or selectively updated in accordance with changes to the information 217 within the rolling timeframe of the recorded history 215. Thus, because the requests 255 for retransmission provide an accurate reflection of the RF conditions of a wireless connection, the dynamically updated packet-loss percentage provides a real-time expression of the state of the wireless connection.

By way of clarification, in one instance, dynamically updating the packet-loss percentage can be utilized to appreciate worsening RF conditions of the wireless connection. In this instance, the probability-computing component 230 may detect an incline in the requests 255 for retransmission, where the incline is not proportional to any increase in the number of data packets 155 transmitted within the same rolling timeframe. The probability-computing component 230 may then synchronously increase the packet-loss percentage in tandem with the incline in the requests 255. Upon recognizing the increase in the packet-loss percentage, the probability-computing component 230 may ask the tuning component 235 to adjust the time-interval of the timer mechanism 240. In a particular embodiment, when the packet-loss percentage is increased above a predetermined threshold, the probability-computing component 230 may ask the tuning component 235 to dynamically tune the timer mechanism 240 by enlarging the time-interval to invoke retransmission of the requested data packets. Accordingly, by enlarging the time-interval, more time is granted to the data packets 155 to negotiate the worsening RF conditions, thereby increasing the likelihood of reaching the destination device 130.

In another instance, dynamically updating the packet-loss percentage can be utilized to appreciate improving RF conditions of the wireless connection. In this instance, the probability-computing component 230 may detect a decline in the requests 255 for retransmission, where the decline is not proportional to any decrease in the number of data packets 155 transmitted within the same rolling timeframe. The probability-computing component 230 may then synchronously decrease the packet-loss percentage in tandem with the decline in the requests 255. Upon recognizing the decrease in the packet-loss percentage, the probability-computing component 230 may ask the tuning component 235 to adjust the time-interval of the timer mechanism 240. In a particular embodiment, when the packet-loss percentage is decreased below a predetermined threshold (e.g., of a set of thresholds with a predetermined range of percent-reception therebetween), the probability-computing component 230 may ask the tuning component 235 to dynamically tune the timer mechanism 240 by contracting the time-interval to invoke retransmission of the requested data packets. Accordingly, by contracting the time-interval, less time is granted to the data packets 155 to negotiate the improved RF conditions, thereby reducing unnecessary transmission delay when transmitting to the destination device 130.

Although two different configurations of tuning the time-interval have been described, it should be understood and appreciated by those of ordinary skill in the art that other types of suitable rules, heuristics, and/or algorithms that adjust the time-interval of the timer mechanism 240 based on changes to a ratio of data packets sent to data packets successfully received may be used, and that embodiments of the present invention are not limited to those correlations of percent packet-loss to time-interval described herein. For instance, the tuning component 235 may be asked to tune the time-interval upon the number of requests 255 for retransmission increasing or decreasing a specified amount for a specified duration of time.

In addition, the probability-computing component 230 may be adapted to configure the rolling timeframe (e.g., last 100 transmitted data packets). That is, the rolling time frame may be enlarged or contracted in volume, thereby altering the amount of information 217 in the recoded history 215 that is encompassed by the rolling time frame. In effect, adjusting the volume of the information 217 in the recorded history 215 that is utilized when calculating the probability of packet-loss may influence whether the dynamic tuning of the time-interval is tightly responsive to any changes in RF conditions, is gradually responsive (e.g., smoothing or averaging) to changes in RF conditions, or is responsive at a rate therebetween.

The tuning component 235, in embodiments, is configured to dynamically tune a time-interval of the timer mechanism 240 in accordance with the calculated probability of packet-loss, as discussed above. In general, the timer mechanism 240, upon elapse of the tuned time-interval, invokes instructions for retransmittal of the data packets 155 that are indicated as missing by the request 255 for retransmission. The tuned time-interval may be started upon the sender component 220 receiving the requests 255 for retransmission and, in response, relaying appropriate instructions to the timer mechanism 240. The "timer mechanism" 240, as used herein, may refer to any hardware, software, or combination thereof, that is adapted to begin a time-interval, track the elapse of the time-interval, and provide an indication upon the expiration of the time-interval. Further, the timer mechanism 240 may be a stand-alone device, may be fully or partially integrated within the devices 120 or 130, may be accommodated by the data store 210, or may reside on a computing device (not shown) connected within the wireless network environment 200.

In an exemplary embodiment, the destination device 130 includes a receiver component 250, an identifying component 260, a buffer component 265, a redistribution component 270, and an application component 275. The application component 275, may be any program or computer software that can execute an application. Further, the application component 275 may reside, in full or in part, within the destination device 130 or may be accommodated on another computing device linked to the destination device 130. In operation, the application component 275 is configured to receive (e.g., in the form of blocks) and process the data packets 155 comprising the data item that are received by the receiver component 250 and temporarily stored by the buffer component 265.

Initially, the receiver component 250 is configured to detect the data packets 155 transmitted from the source device 120 that are targeted toward the destination device 130. As discussed above, the data packets 155 may be transmitted over a wireless connection provided between the source device 120 and the destination device 130 that accommodates RLP. In addition, the receiver component 250 may be configured to assemble the detected data packets 155 according to an ordering predefined by the source device 120. As discussed above, sequence numbers (e.g., time stamps) may be assigned to the data packets 155 by the source device 120. The receiver component 150 may utilize these sequence numbers, which correspond to the ordering predefined by the source device 120, to arrange the data packets 155 in the sequence number space. Further, assembling the detected data packets 155 according to the ordering predefined by the source device 120 includes sorting the detected data packets 155 into the predefined ordering and temporarily storing the ordered data packets 155 in the buffer component 265.

In one instance, sequence numbers may be utilized to identify each byte of data within the data item. These sequence numbers can be ordered, arbitrary, or unpredictable, in order to avoid attacks. In operation, the sequence numbers identify the order of the bytes sent from the source device 120 so that the data item can be transferred reliably and in order, regardless of any fragmentation, disordering, or packet loss that occurs during transmission. Generally, for every byte transmitted, the sequence number is incremented. Additionally, an initial sequence number (ISN), or predefined ordering, may be exchanged between the source device 120 and the destination device 130. This way, the identifying component 260 will understand whether a detected data packet 155 is expected and in order, out-of-order, duplicative, or missing altogether.

Generally, the buffering component 265 is used for buffering the assembled data packets 155 prior to redistribution to the application component 275. Buffering may also be interposed throughout the system 100 of FIG. 1 to handle delays therein. These buffers, or intermediate data storage points may be used to automate and schedule non-real-time data transfers to provide a complete set of the data packets 155, in the predefined ordering, to the application component 275 with minimal gaps or missing data packets. In general, the buffer size is scaled proportionally to the amount of data packets 155 "in flight" at any time.

Due to wireless network congestion, traffic load balancing, or other unpredictable network behavior, the data packets can be missing, lost, or delivered out of order. As used herein, the phrase "missing data packets" is not meant to be limiting, but may encompass any transmitted data packets 155 that are corrupt, absent, unexpected, out-of-order in consideration of the predefined ordering, and the like. Missing data packets may be lost by errors in transmission, network-related delay in throughput (e.g., RF conditions), or any other cause for the data packets 155 to be undetected known to one of ordinary skill in the art. Accordingly, the identifying component 260, in embodiments, is configured to recognize that expected data packets are missing and to prompt the receiver component 250 to request retransmission of lost data packets. In one instance, recognizing missing data packets involves monitoring vacancies upon comparing the arranged data packets 155 against the predefined ordering, and identifying the missing data packet(s) that are expected to occupy the vacancies within the arranged data packets.

Upon ascertaining data packet(s) are missing, the identifying component 260 may ask the receiver component 250 to communicate one or more requests 255 to the source device 120 to retransmit the missing data packet(s). As discussed above, the source device 120 is configured to calculate a probability of packet-loss utilizing a recorded history 215 of the requests 255 and facilitate dynamically tuning a time-interval of the timer mechanism 240 in accordance with the calculated probability of packet-loss. As discussed above, an example of dynamically tuning the time-interval in accordance with the calculated probability of packet-loss includes enlarging the time-interval to invoke retransmission of the missing data packet when the probability of packet-loss is calculated to be increased, or contracting the time-interval to invoke retransmission of the missing data packet when the probability of packet-loss is calculated to be decreased.

Based on the determinations made by the identifying component 260, the receiver component 250 may send a response to the source device 120. In an exemplary embodiment, the receiver component 250 relies on an acknowledgment scheme to determine the appropriate response. In one instance, when the data packets 155 are received in order, the acknowledgment scheme instructs the receiver component 250 to send a positive acknowledgement (e.g., ACK) to the source device 120. Generally, the positive acknowledgment signifies that the receiver component 120 has received all data preceding the acknowledged sequence number. In addition, the positive acknowledgment may specify the sequence number of the next data packet that is expected based on the predefined ordering. For example, with reference to FIG. 4, if the source device 120 sends four data packets with a sequence numbers of 1, 2, 3, and 4, assigned thereto, then the receiver component 250 would send back an acknowledgment of 5 as that is the next data packet it expects to receive. By sending the positive acknowledgment, the receiver component 250 is signaling that it received data packets 1-4 correctly. Further, the redistribution component 270 is configured to redistribute the data packets 1-4 to the application component 275 when the order of delivery is correct.

Figure 4:
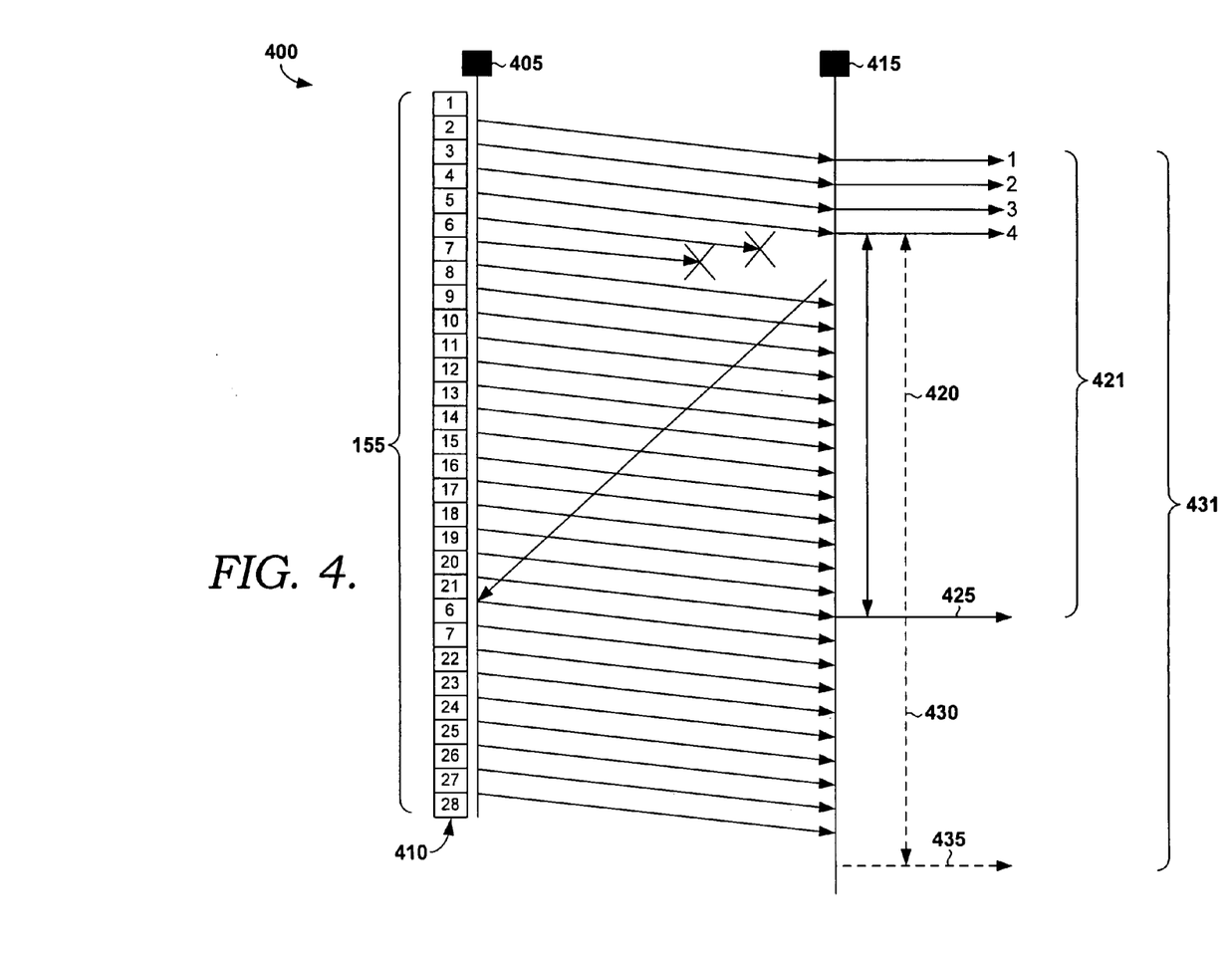
FIG. 4 is a graphical depiction illustrating a sequential progression of data packet transmission, in accordance with an embodiment of the present invention.

If, by some chance, the next two data packets 5 and 6 were missing or corrupted, then the acknowledgment scheme may instruct the receiver component 250 to provide a request 255 for retransmission (e.g., NAK) that informs the source device 120 the data packets 7, 8, 9 . . . have arrived out of order. Further, upon ascertaining that data packet(s) are missing, the receiver component 250 may instruct the timer mechanism 240 to start the time-interval and the redistribution 270 component may delay redistribution of the aggregated data packets 7, 8, 9 . . . until the earlier of the elapse of the time-interval or the receipt of the missing data packets 5 and 6. As can be seen in FIG. 4, short time-interval 420 will elapse prior to the receipt of the missing data packets 5 and 6. Accordingly, the group 421 of data packets 7-20 will not forwarded to the application component 275, as indicated by reference numeral 425. Alternatively, a longer time interval 430 will elapse after the receipt of the missing data packets 5 and 6. This allows the receiver component 250 to organize the data packets 155 based on the ordering. Accordingly, the group 431 of data packets 5-28 will be forwarded to the application component 275 as block 435. Thus, a fine-tuned time-interval, adjusted based on RF conditions that inhibit transmission of the data packets 155, would expire soon after data packets 5 and 6 arrive. That way, the process of retransmission is avoided while delays between receiving the data packets 155 and redistributing them as a block 435 are avoided.

The requests 255 for retransmission of out-of-order or missing data packets may take any form, such as a NAK. The NAK transmission control character is a negative response that may be utilized a main form feedback to the source device 120. In operation, the source device 120 may assume that each transmission was successful, and the receiver component 120 will provide NAK's when a missing data packet is detected. This greatly reduces reverse-link transmissions, which are spectrally inefficient and have a longer latency on most cellular networks. As such, the receiver component 250 precisely informs the sender component 220 about which data packets have been lost. This increases performance on wireless connections when multiple losses per window are possible. Accordingly, a NAK is a signal used by embodiments of the present invention to ensure that the data item is received with a minimum of errors.

Returning to FIG. 2, the receiver component 250 reassembles the data packets 155 at the buffer component 265 into a copy of the data item originally transmitted, while the redistribution component 270 passes that copy of the data item, or datagram, to the application component 275. In embodiments, the redistribution component 270 allows the data packets 155 to be aggregated in the buffer component 265 until a limit of the receive window is satisfied. As discussed above, the receive window governs the amount of bytes, distributed via the data packets 155, which are buffered prior to redistribution to the application component 275. As such, in embodiments, the source device 120 can send only up to that amount of data limited by the receive window before it must wait for an acknowledgment and window update from the destination device 130. In this way, receive windows behave very much like a clock, where the receive window shifts each time the receiver component 250 receives and acknowledges a new data packet 155. Next, the redistribution component 270 may trigger communicating to the source device 120 an indication that the aggregated data packets are ready for redistribution. By way of example, this indication may include a positive acknowledgement that confirms the receipt of the detected data packets and any missing data packets that satisfy the limit of the receive window.

This exemplary system architecture of the wireless network environment 200 is but one example of a suitable environment that may be implemented to carry out aspects of the present invention, and is not intended to suggest any limitation as to the scope of use or functionality of the invention. Neither should the illustrated exemplary system architecture be interpreted as having any dependency nor requirement relating to any one or combination of the components 215, 220, 225, 230, 235, 240, 250, 260, 265, 270, and 275 as illustrated. In some embodiments, one or more of the components 215, 220, 225, 230, 235, 240, 250, 260, 265, 270, and 275 may be implemented as stand-alone devices. In other embodiments, one or more of the components (e.g., the sender component 220 and/or the receiver component 250) may be integrated directly into the wireless network 110 of FIG. 1. It will be understood by those of ordinary skill in the art that the components 215, 220, 225, 230, 235, 240, 250, 260, 265, 270, and 275 illustrated in FIG. 2 are exemplary in nature and in number and should not be construed as limiting.

Accordingly, any number of components may be employed to achieve the desired functionality within the scope of embodiments of the present invention. Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting (e.g., although only one source device 120 and one destination device 130 are shown, many more may be communicatively coupled to the wireless network).

Further, the components of the exemplary system architecture may be interconnected by any method known in the relevant field. For instance, the source device 120 and destination device 130 may be operably coupled via a distributed communications environment. In embodiments, the wireless network 110 of FIG. 1 may include, without limitation, one or more local area networks (LANs) and/or wide area networks (WANs). Such networking environments are commonplace in offices, enterprise-wide computer networks, intranets, and the Internet.

In yet other embodiments, the wireless network 110 of FIG. 1 may couple components 215, 220, 225, 230, 235, 240, 250, 260, 265, 270, and 275 of FIG. 2, thereby forming a distributed computing environment where tasks are performed by remote-processing devices that are linked through appropriate connections. These connections may be established by wired technologies, wireless technologies, or a combination thereof. Examples of particular wired embodiments, within the scope of the present invention, include USB connections and cable connections. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.) that are different from the specific illustrated embodiments. Therefore it is emphasized that embodiments of the connections between components are not limited by the examples described, but embrace a wide variety of methods of communications.

Figure 3:
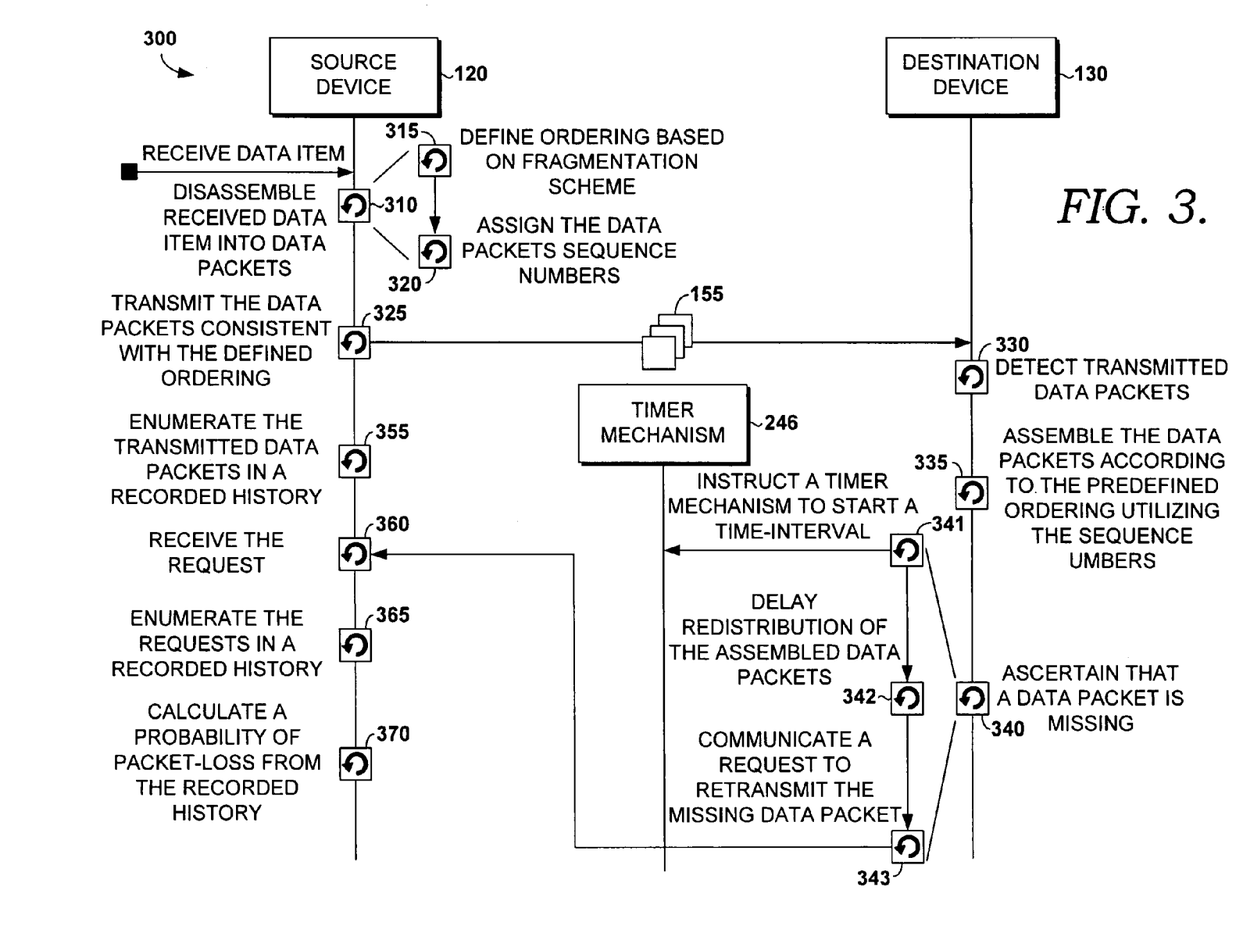
FIG. 3 is an operational flow diagram illustrating a high level overview of a technique for tuning a timer mechanism of one embodiment of the present invention.

An overall technique for tuning a timer mechanism to function consistent with RF conditions will now be discussed with reference to FIG. 3. In general, FIG. 3 is an operational flow diagram illustrating a high level overview of a technique 300 for tuning the timer mechanism 240 of one embodiment of the present invention. This technique 300 is supported by the devices 120 and 130 discussed above. Initially, the technique 300 involves receiving the data item 305 at the source device 120. As indicated at process 310, the data item 305 may be disassembled into data packets. In an exemplary embodiment, the process 310 may include procedure 315, which involves defining an ordering based on a fragmentation scheme, and procedure 320, which involves assigning the data packets sequence numbers according to the fragmentation scheme (e.g., ISN or defined ordering). As indicated at process 325, the data packets, represented by reference numeral 155, are transmitted to the destination device 130 consistent with the defined ordering.

The destination device 130, in embodiments, may detect the transmitted data packets, as indicated by process 330. Typically, the data packets are assembled according to the predefined ordering utilizing the sequence numbers previously assigned by the source device 120. This is indicated at process 335. Potentially, one or more of the data packets may be ascertained to be missing, as indicated at process 340. In embodiments, process 340 may involve at least one of the following procedures, in no particular order: procedure 341 where a timer mechanism 240 is instructed to start tracking a time-interval; procedure 342 where redistribution of the assembled data packets is delayed; and procedure 343 where a request to retransmit the missing data packet(s) is communicated to the source device 120.

In response to receiving the request (e.g., the request 255 for retransmission of FIG. 2), as indicated at process 360, the source device 120 may enumerate the requests in a recorded history, as indicated at process 365, and/or may calculate a probability of packet loss from the recorded history, as indicated at process 370. Further, the source device 120 may dynamically tune a time-interval of the timer mechanism 240 based on the calculated probability, as indicated as process 375. As indicated at process 380, the timer mechanism 240 may store the tuned time-interval for use when timing a delay between initial transmission and automatic retransmission of the missing data packet.

Upon receiving an indication that one or more of the transmitted data packets are missing, the source device 120 may retransmit the missing data packets, as indicated at process 385. Upon successful reception of the missing data packet, the destination device 130 may transmit a positive response acknowledging receipt of the missing data packet, as indicated at process 385. If reception of the missing data packet is unsuccessful, the timer mechanism 240 may provide an indication that the time-interval is elapsed, upon tracking the elapse of the time-interval, as indicated by process 397.

Figure 5:
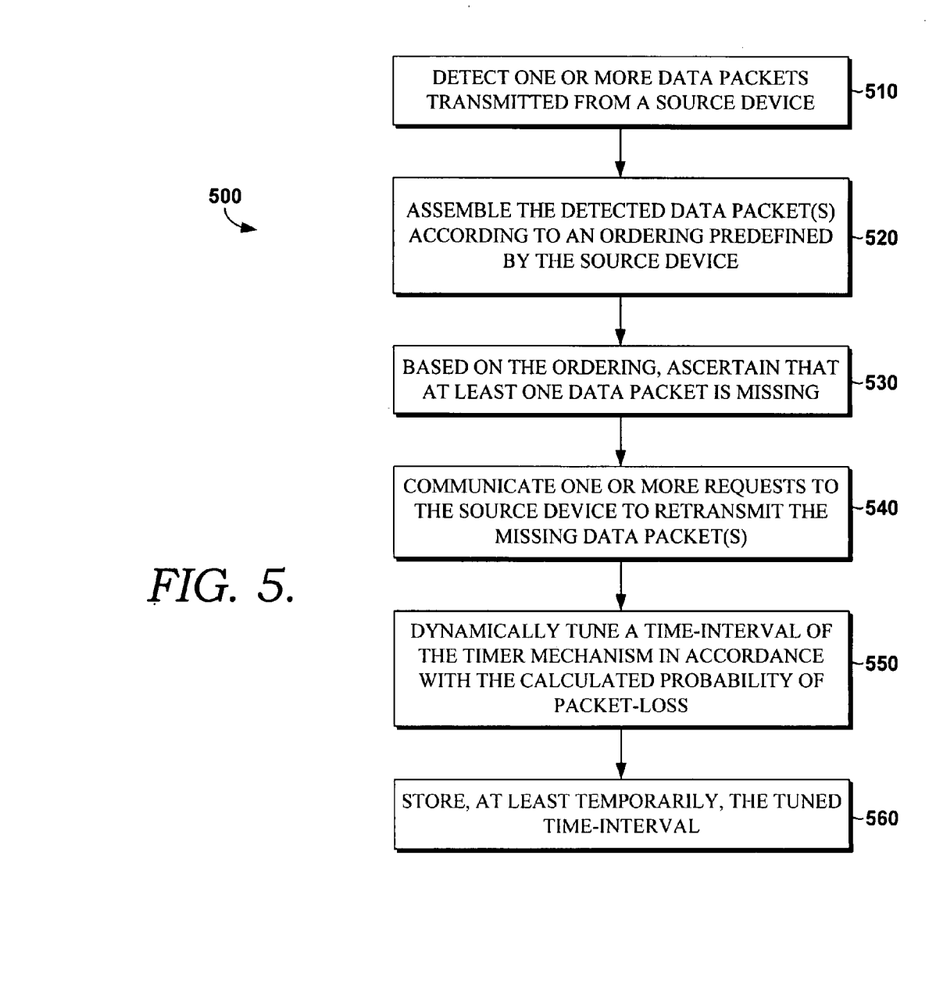
FIG. 5 is a flow diagram showing an overall method for dynamically tuning a timer mechanism to optimize transmission of data packets within a wireless network from the perspective of a destination device, in accordance with an embodiment of the present invention.

Turning to FIG. 5, a flow diagram showing an overall method 500 for dynamically tuning a timer mechanism to optimize transmission of data packets within a wireless network from the perspective of the destination device (e.g., destination device 130 of FIG. 1) is shown, in accordance with an embodiment of the present invention. Although the terms "step" and "block" are used hereinbelow to connote different elements of methods employed, the terms should not be interpreted as implying any particular order among or between various steps herein disclosed unless and except when the order of individual steps is explicitly described. Generally, the method includes detecting one or more data packets (e.g., data packets 155 of FIG. 1) transmitted from a source device (e.g., source device 120 of FIG. 1), as depicted at block 510. Block 520 depicts the step of assembling the detected data packets according to an ordering predefined by the source device.

Based on the ordering, at least one data packet may be ascertained to be missing, as depicted at block 530. One or more requests (e.g., requests 255 for retransmission of FIG. 2) may be communicated to the source device to retransmit the missing data packet(s), as indicated at block 540. As discussed above, the source device is configured to calculate a probability of packet-loss utilizing a recorded history of the communicated requests. Based on the calculated probability of packet-loss, a time-interval of the timer mechanism (e.g., timer mechanism 240 of FIG. 2) may be dynamically tuned. This is indicated at block 550. In operation, the time-interval, upon elapse, invokes the source device to retransmit the data packet(s) to the destination device. Further, as indicated at block 560, the tuned time-interval may be storing at either of the devices or on a separate entity.

Figure 6:
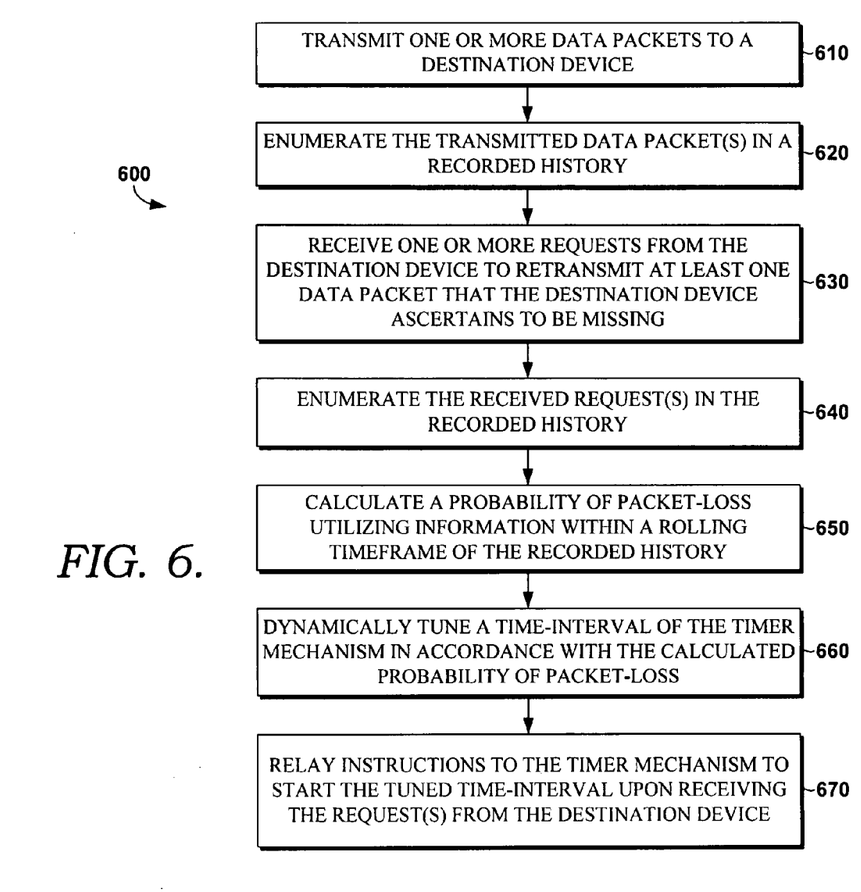
FIG. 6 is a flow diagram showing an overall method for dynamically tuning a timer mechanism to optimize transmission of data packets within a wireless network from the perspective of a source device, in accordance with an embodiment of the present invention.

With reference to FIG. 6, a flow diagram showing an overall method 610 for dynamically tuning a timer mechanism to optimize transmission of data packets within a wireless network from the perspective of the source device 120 of FIG. 1 is illustrated, in accordance with an embodiment of the present invention. Initially, the method of dynamically tuning a timer mechanism includes the steps of transmitting one or more data packets to the destination device 130 of FIG. 1 (see block 610), and enumerating the transmitted data packet(s) in a recorded history (see block 620). As depicted at block 630, one or more requests are received from the destination device to retransmit at least one data packet that the destination device ascertains to be missing. Further, upon the destination device ascertaining there exists missing data packet(s), the source device may enumerate the received request(s) in the recorded history (see block 630), and calculate a probability of packet-loss utilizing information within a rolling timeframe of the recorded history (see block 650). Based on the calculated probability of packet-loss, a time-interval of the timer mechanism may be dynamically tuned, as depicted at block 660. In addition, as depicted at block 670, upon receiving one or more requests from the destination device, instructions may be relayed to the timer mechanism to start the tuned time-interval.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-useable instructions embodied thereon that, when executed, perform a method for dynamically tuning a timer mechanism to optimize transmission of one or more data packets within a wireless network, wherein the method comprises:
    detecting the one or more data packets transmitted from a source device;
    assembling the detected one or more data packets according to an ordering predefined by the source device;
    based on the ordering, ascertaining that at least one data packet is missing;
    communicating one or more requests to the source device to retransmit the at least one missing data packet, wherein the source device is configured to calculate a probability of packet-loss utilizing a recorded history of the one or more requests;
    dynamically tuning a time-interval of the timer mechanism in the source device by enlarging the time-interval to invoke retransmission of the at least one missing data packet when the probability of packet-loss is calculated to be increased and contracting the time-interval to invoke retransmission of the at least one missing data packet when the probability of packet-loss is calculated to be decreased, wherein the timer mechanism, upon elapse of the time-interval, invokes the source device to retransmit the one or more data packets; and
    storing, at least temporarily, the tuned time-interval.

2. The non-transitory computer-readable media of claim 1, the method further comprising providing a wireless connection between the source device and a destination device that accommodates a radio-link protocol (RLP) receiving component for performing the process of assembling the detected one or more data packets into the ordering predefined by the source device.

3. The non-transitory computer-readable media of claim 2, wherein communicating one or more requests to the source device to retransmit the at least one missing data packet comprises transmitting a negative-acknowledgement decoder (NAK) that informs the source device the one or more data packets have arrived out of order.

4. The non-transitory computer-readable media of claim 1, wherein detecting one or more data packets transmitted from a source device further comprises recognizing sequence numbers assigned to the one or more detected data packets by the source device, wherein sequence numbers correspond to the ordering predefined by the source device.

5. The non-transitory computer-readable media of claim 4, wherein assembling the detected one or more data packets according to an ordering predefined by the source device comprises arranging the one or more detected data packets into the predefined ordering in accordance with the assigned sequence numbers.

6. The non-transitory computer-readable media of claim 5, wherein ascertaining that at least one data packet is missing comprises:
    monitoring vacancies upon comparing the one or more arranged data packets against the predefined ordering; and
    identifying the at least one missing data packet that is expected to occupy the vacancies within the one or more arranged data packets.

7. The non-transitory computer-readable media of claim 6, wherein assembling the detected one or more data packets according to an ordering predefined by the source device further comprises aggregating the one or more data packets until a limit of a receive window is satisfied, wherein the receive window governs the amount of bytes, distributed via the one or more data packets, that are buffered prior to redistribution to an application component residing on a destination device.

8. The non-transitory computer-readable media of claim 7, wherein when it is ascertained that at least one data packet is missing, the method further comprising:
    instructing the timer mechanism to start the time-interval; and
    delaying redistribution of the one or more aggregated data packets until the earlier of the elapse of the time-interval or the receipt of the at least one missing data packet.

9. The non-transitory computer-readable media of claim 8, the method further comprising, incident to the receipt of the at least one missing data packet, communicating to the source device an indication that the one or more aggregated data packets are ready for redistribution, wherein the indication includes an acknowledgement code (ACK) that acknowledges the receipt of the one or more detected data packets and the at least one missing data packet that satisfy the limit of the receive window.

10. The non-transitory computer-readable media of claim 8, wherein the at least one missing data packet comprises at least one of a corrupt data packet, an absent data packet, an unexpected data packet, or an out-of-order data packet in consideration of the predefined ordering.

11. A computerized method for dynamically tuning a timer mechanism based on a calculated probability of packet-loss, wherein the method comprises:
    transmitting one or more data packets to a destination device;
    enumerating the one or more transmitted data packets in a recorded history;
    receiving one or more requests from the destination device to retransmit at least one data packet that the destination device ascertains to be missing;
    enumerating the one or more received requests in the recorded history;
    calculating a probability of packet-loss utilizing information within a rolling timeframe of the recorded history;

dynamically tuning a time-interval of the timer mechanism in a source device by enlarging the time-interval to invoke retransmission of the at least one missing data packet when the probability of packet-loss is calculated to be increased and contracting the time-interval to invoke retransmission of the at least one missing data packet when the probability of packet-loss is calculated to be decreased, wherein the timer mechanism, upon elapse of the time-interval, invokes retransmittal of the one or more data packets; and relaying instructions to the timer mechanism to start the tuned time-interval upon receiving the one or more requests from the destination device.

12. The computerized method of claim 11, wherein transmitting one or more data packets to a destination device comprises:

disassembling a data item received from an application component residing on a source device, wherein disassembly is carried out according to a fragmentation scheme;

defining an ordering based on the fragmentation scheme; and assigning the one or more data packets sequence numbers the correspond to the defined ordering.

13. The computerized method of claim 12, wherein transmitting one or more data packets to a destination device further comprises delivering the one or more data packets, consistent to the defined ordering, as a stream of bytes over a wireless connection between the destination device and a source device that accommodates a radio-link protocol (RLP) sending component for performing the process of disassembling the data item.

14. The computerized method of claim 11, wherein calculating a probability of packet-loss utilizing information within a rolling timeframe of the recorded history comprises:

deriving a packet-loss percentage based on a ratio of the one or more requests for retransmission received within the rolling timeframe to the one or more data packets transmitted within the rolling timeframe; and updating the packet-loss percentage in accordance with changes to the information within the rolling timeframe of the recorded history.

15. The computerized method of claim 14, further comprising:

appreciating worsening radio frequency (RF) conditions of the wireless connection upon detecting a non-proportional incline in the one or more requests;

synchronously increasing the packet-loss percentage in tandem with the incline in the one or more requests; and when the packet-loss percentage IS increased above a predetermined threshold, the probability of packet-loss is calculated to be increased.

16. The computerized method of claim 14, further comprising:

appreciating improving RF conditions of the wireless connection upon detecting a non-proportional decline in the one or more requests;

synchronously decreasing the packet-loss percentage in tandem with the decline in the one or more requests; and when the packet-loss percentage IS decreased below a predetermined threshold, the probability of packet-loss is calculated to be decreased.

17. The computerized method of claim 14, further comprising configuring the rolling timeframe to enlarge or contract the information in the recorded history that is encompassed thereby, thereby adjusting the volume of the recorded history information that is utilized when calculating the probability of packet-loss.

18. A computer system for performing a process that dynamically tunes a timer mechanism based on transmitted data packets and requests for retransmission of those data packets that are received out of order, the computer system comprising a processing unit coupled to a computer storage medium, the computer storage medium having stored thereon a plurality of computer software components executable by the processing unit, the computer software components comprising:

a sending component configured to transmit the data packets to a receiving component based on a predefined ordering, and to enumerate the transmitted data packets in a recorded history; and the receiving component configured to detect and assemble the transmitted data packets, and to communicate the requests for retransmission of a portion of the data packets that are received out of order in comparison against the predefined ordering, wherein the sending component is further configured to calculate a probability of packet-loss utilizing the recorded history in concert with the requests for retransmission;

a timer mechanism configured with a time-interval that is capable of being dynamically tuned by enlarging the time-interval to invoke retransmission of the at least one missing data packet when the probability of packet-loss is calculated to be increased and contracting the time-interval to invoke retransmission of the at least one missing data packet when the probability of packet-loss is calculated to be decreased, wherein, upon elapse of the time-interval, the timer mechanism is further configured to invoke the source device to retransmit the data packets.

19. The computer system of claim 18, wherein the receiving component is further configured to arrange the detected data packets in a buffer according to the predefined ordering and, when the sending component has sufficiently retransmitted the data packets that fulfill the requests for retransmission, to redistribute the arranged data packets upon determining that a limit of a receiving window is satisfied, otherwise, to await retransmission of each of the data packets associated with the receiving window.

* * * * *